April 30, 1946.    K. J. GERMESHAUSEN    2,399,222
FLASH-PHOTOGRAPHY APPARATUS
Filed Nov. 8, 1941    2 Sheets-Sheet 1
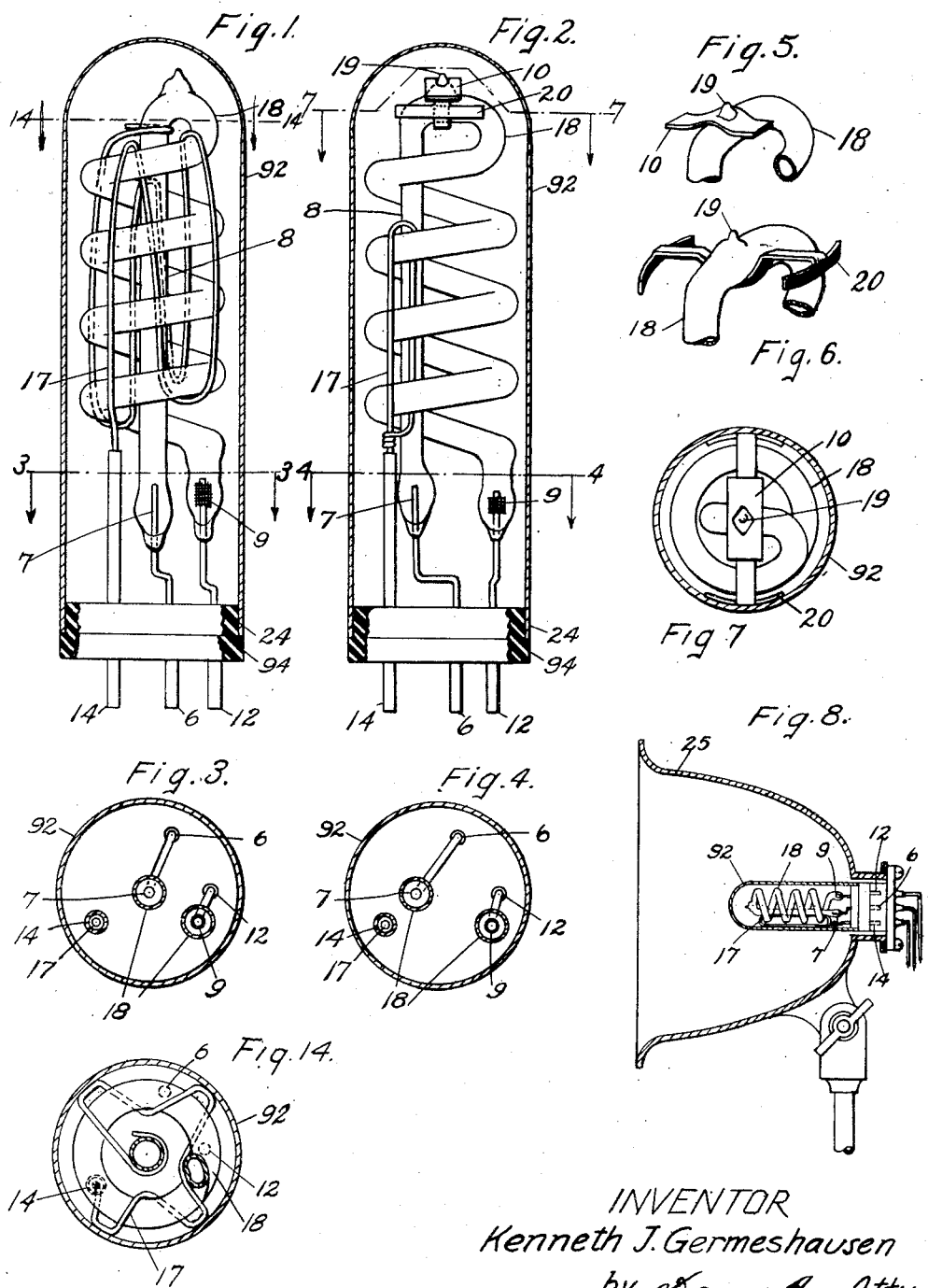
INVENTOR
Kenneth J. Germeshausen
by David Rines Atty.

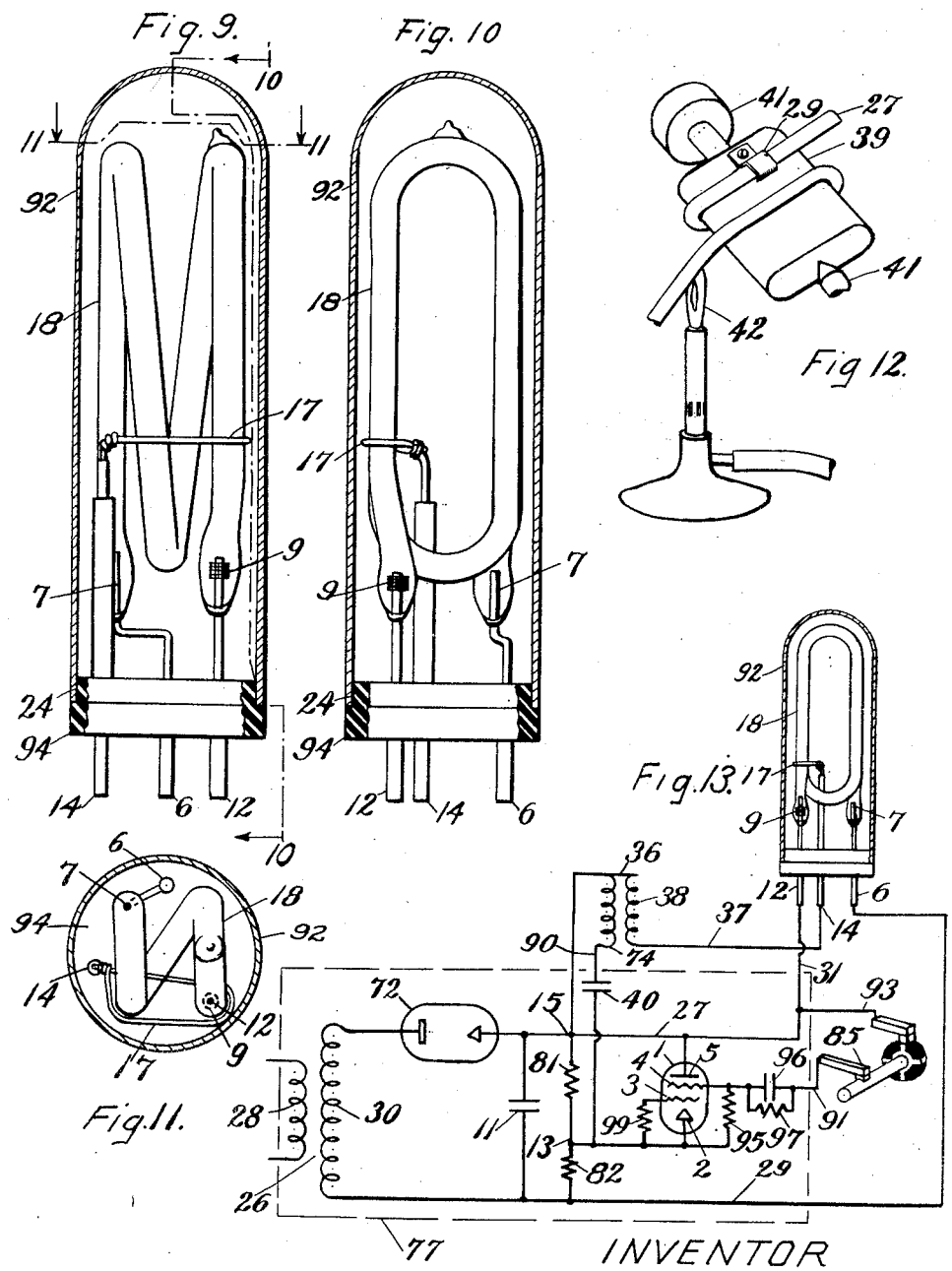

Patented Apr. 30, 1946

2,399,222

UNITED STATES PATENT OFFICE 2,399,222

FLASH-PHOTOGRAPHY APPARATUS

Kenneth Joseph Germeshausen,
Newton Center, Mass.

Application November 8, 1941, Serial No. 418,403

14 Claims. (Cl. 240—1.3)

The present invention relates to electric systems and apparatus, and more particularly to systems and apparatus designed for flash-photography.

In such systems, a gaseous-discharge high-voltage flash-lamp is ordinarily employed to produce the exposure flash for illuminating the object to be photographed. The photographer trips the flash-lamp to produce the exposure flash at a time when satisfied, through observation with the aid of an incandescent lamp or other light-source, that the object to be photographed will yield the best results on the photographic plate or film. The relatively high voltage to which such lamps are usually subjected is a drawback, because manipulation thereof by the operator may subject him to electric shock.

An object of the present invention, therefore, is to provide apparatus of the above-described character in which the high-voltage apparatus shall be enclosed in an outside bulb or envelope that shall protect the operator against the high voltage.

In Letters Patent 2,277,697, issued March 31, 1942, to Herbert E. Grier, the light-source and the flash-lamp are described as so positioned, in an outside protecting tube or bulb of the nature referred to, that their fields of illumination, after reflection from a common reflector, shall have approximately the same center. The flash-lamp produces a very brilliant flash for a very brief period of time, which renders it possible to employ a continuous very much weaker light-source that need not be extinguished during the exposure flash. The system, though quite efficient, is attended by complications that it is another object of the present invention to avoid.

A further object is to provide a smaller and less expensive unit than is described in the said Grier Letters Patent, though a unit having a high efficiency.

Other and further objects will be described hereinafter and will be particularly pointed out in the appended claims.

The invention will now be described more fully in connection with the accompanying drawings, in which Fig. 1 is a longitudinal section of a lamp embodying the present invention; Fig. 2 is a similar section of a modification; Fig. 3 is a transverse section taken upon the line 3—3 of Fig. 1, looking in the direction of the arrows; Fig. 4 is a similar section taken upon the line 4—4 of Fig. 2, looking in the direction of the arrows; Figs. 5 and 6 are fragmentary perspectives of details; Fig. 7 is a section taken upon the line 7—7 of Fig. 2, looking in the direction of the arrows; Fig. 8 is a view illustrating the flash-lamp mounted in a reflector, both shown in section; Fig. 9 is a section similar to Fig. 1 of a further modification; Fig. 10 is a similar section taken upon the line 10—10 of Fig. 9, looking in the direction of the arrows; Fig. 11 is a top-plan view of Figs. 9 and 10; Fig. 12 is a perspective illustrating a step in the manufacture of the flash-lamp tube shown in Figs. 9, 10 and 11; Fig. 13 is a circuit diagram showing the flash-lamp of the present invention connected therein; and Fig. 14 is a section taken upon the line 14—14 of Fig. 1, looking downward in the direction of the arrows.

An elongated light-permeable glass-bulb jacket or envelope 92 is shown cemented at 24 to a flat, insulating base plug 94 provided with three plug-in pin terminals 6, 12 and 14, for connecting the flash-lamp into circuit. The envelope 92 may be either clear or frosted; in the latter case, it will yield a better distribution of the light when used with conventional reflectors, such as the reflector 25, in which it may be mounted by means of the pin terminals 6, 12 and 14. The use of the reflector 25 is not, in all cases, essential.

A normally non-conducting gaseous-discharge flash-lamp 18, that may contain krypton or any other suitable gas, is mounted in the envelope 92. It is preferred, though not essential, that the flash-lamp be helically coiled. The axis of the helical coil of the lamp 18 is shown in Figs. 1 to 8 substantially coinciding with, or parallel to, the axis of the bulb 92. According to the modification of Figs. 9 to 13, the axis of the helix of the flash-lamp 18 is disposed at right angles to the axis of the bulb 92. The helix illustrated in Figs. 1 to 8 is provided with a return center leg 8, which may be disposed along the axis of the helix, as illustrated in Figs. 1 and 3, or to one side of, and parallel to this axis, as illustrated in Figs. 2, 4 and 8. The flash-lamp 18 is provided with two electrode terminals, constituted of a cathode 7 and an anode 9, both positioned near the base plug 94, and connected, respectively, to the plug-in terminals 6 and 12. The presence of the center leg 8, in the construction of Figs. 1 to 8, makes it possible to mount one of the electrodes 7 and 9 near the base plug 94, and the other end of the helix or spiral makes it possible to mount the other electrode near the base plug. Both ends of the helix are positioned near the base plug 94 in the construction of Figs. 9 to 13.

The parts are held permanently steady in correct position, and properly lined up, in the bulb 92, by means of suitable metal spreaders 10 and 20. The spreader 20, centrally disposed, is provided with arcuate shoes engaging against the inner walls of the bulb 92 and an interiorly disposed recess in which the upper end of the flash-lamp 18 is positioned. The spreader 20 thus acts as a girth. The spreader 10, which may also be centrally disposed, and operating like a saddle, is provided with an opening through which extends a projection 19 at the extreme upper top of the flash-lamp 18. The projection may be constituted of the exhaust nipple of the helix. The use of the spreaders 10 and 20 is not, however, essential. As illustrated, the flash-lamp 18 may be held steady in place on the bulb 92 without the aid of the spreaders. This projection 19 is shown disposed to one side of the axis of the helix in Fig. 1. In Figs. 2, 7 and 8, however, it is shown disposed on the axis.

One end of a high-voltage spark trigger or trip-wire electrode 17 is connected to the plug-in terminal 14, and its other end is mounted over a plurality of the coils or turns of the helical-tube flash-lamp 18. If the said other end is wound helically about the coils or turns of the flash-lamp 18, as illustrated in Fig. 1, it will serve also better to steady the flash-lamp 18 on the envelope cover 92. The envelope 92 protects the operator from the high voltage of the flash-lamp 18 and the trigger wire 17 without preventing the light of the flash from penetrating the envelope.

A flash-lamp of the construction illustrated in Figs. 9 to 13 has the advantage of cheapness of manufacture and ease of mounting in the envelope 92. Referring to Fig. 12, it may be produced by clamping one end 27 of a glass tube at 29 on a carbon mandrel or block 39 that may be rotated in a lathe 41. During the slow rotation of the mandrel 39, a Bunsen-burner flame 42 may be caused to play upon specified parts of the glass tubing 27 to soften them, thus permitting the glass to become bent at appropriate points around the mandrel 39, into helical form, as illustrated. A helix or spiral wound in this fashion requires no further working such as is necessary to put in the center leg 8 of the spiral in Fig. 1.

In Fig. 8, the axis of the reflector 25 is shown substantially coincident with the axis of the helical flash-lamp 18 and the tube 92. When the flash-lamp 18 shown in Figs. 9 to 13 is employed, however, the axis of the reflector will be at right angles to the axis of the helix, though still alined with the axis of the envelope 92.

The apparatus may be used in conjunction with a control circuit 77, which may be of the nature more fully disclosed in the said Letters Patent. The flash-lamp 18 may be connected, as there described, through the medium of the terminal pins 12 and 6, across a condenser 11. To this end, the terminal pin 12 may be connected to a terminal 15 at one side of the condenser 11 by conductors 31 and 27, and the terminal pin 6 may be connected to the other side of the condenser 11 by a conductor 29. The condenser 11 may be subjected to a voltage of, say, 2000 volts from any direct-current supply. The preferred supply is shown as a transformer 26, the primary winding 28 of which may be connected to any desired source of alternating-current energy of the correct voltage and frequency, and the secondary winding 30 of which, of high impedance, may be connected to the condenser 11 through a rectifier 72.

A trigger tube 1 may be connected to terminals 15 and 13, across a bleeder resistor 81, so as to be supplied with voltage therefrom. The bleeder resistor 81 is connected, in series with a bleeder resistor 82, across the condenser 11, which constitutes the main power-supply for the tube 1. The resistors 81 and 82 may be so proportioned that a desired voltage of, say, 300 volts shall appear across the terminals 13 and 15 of the resistor 81. To the terminals 13 and 15 there are also connected, in parallel with the tube 1, in series with a condenser 40, a primary winding 74 of a transformer 36. One side of the condenser 40 is connected to the terminal 13 and the other side, by way of a conductor 90, to the primary winding 74. The secondary winding 38 of the transformer 36 is connected, by a conductor 37, to the trip wire 17 to produce the high-voltage triggering spark.

The tube 1 may be of the cold-cathode gaseous-discharge type illustrated and described in Letters Patent 2,185,189, 2,201,166 and 2,201,167, issued to Kenneth J. Germeshausen on January 2, 1940, and May 21, 1940. It may comprise an evacuated glass envelope containing several electrodes, namely, a solid cathode 2, an anode or plate 5, and one or more grids, inner and outer grids being shown at 3 and 4, between the anode 5 and the cathode 2. An impedance 95 is connected between the cathode 2 and the grid 4, and an impedance 99 between the cathode 2 and the grid 3.

The flash-lamp 18 may be tripped by means of a hand-controlled switch (not shown), or, as illustrated and described in the said Letters Patent, by means of an automatically operated contactor 85, that is connected across the anode or plate 5 and the grid 4 by conductors 91 and 93 in series with a blocking condenser 96 and a leak resistor 97, in parallel. The contactor 85 may be actuated by the object being photographed. Further details, together with a fuller description of the circuit connections, are described in the said Letters Patent.

As further described in the said Letters Patent, a voltage surge of the secondary winding 38 of the transformer 36 is applied to the trigger electrode 17 of the tube 18. The transient high-voltage triggering spark ionizes the gas in the flash-tube 18, thereby causing it to become a conductor and permitting the condenser 11 to discharge through the flash-lamp 18 between its electrodes. The time taken for the circuit to function from the closing of the contactor 85 to the flash of light from the tube 18 is very brief, producing a very brilliant flash of light for a very brief period of time at any desired instant, for illuminating the object to be photographed.

Modifications will occur to persons skilled in the art and all such are considered to fall within the scope and spirit of the invention.

What is claimed is:

1. An apparatus for use in photography, having in combination, a helical flash-lamp for producing a very brilliant flash for a very brief period, and a light-permeable envelope in which the flash-lamp is contained, the envelope having an axis substantially at right angles to the axis of the helix of the coil.

2. Apparatus for use in photography having, in combination, a helical flash-lamp for producing a very brilliant flash for a very brief period, a light-permeable envelope in which the flash-lamp is contained, and a reflector in which the envelope with the flash-lamp therein is disposed, the reflector having an axis substantially at right angles to the axis of the helix of the flash-lamp.

3. Apparatus for use in photography having, in combination, a flash-lamp in the form of a helically coiled tube for producing a very brilliant flash for a very brief period, a high-voltage trigger-wire for the flash-lamp, a light-permeable envelope in which the flash-lamp and the trigger-wire are contained, the envelope having an axis substantially at right angles to the axis of the helix of the flash-lamp, and a reflector in which the protective envelope is positioned, the reflector having an axis substantially alined with the axis of the protective envelope.

4. Apparatus for use in flash-photography having, in combination, a normally non-conducting gaseous-discharge flash-lamp, means for impressing a transient high-voltage impulse upon the flash-lamp to render the flash-lamp conducting, means for thereupon producing a very brilliant exposure flash of light in the flash-lamp for a very brief period of time to illuminate the object to be photographed, and a light-permeable envelope in which the flash-lamp is contained to protect the photographer from the high voltage to which the flash-lamp is subjected by the high-voltage impulse but without preventing the light of the flash from penetrating the envelope to the object.

5. Apparatus for use in flash-photography having, in combination, a normally non-conducting gaseous-discharge flash-lamp, means for impressing a transient high-voltage impulse upon the flash-lamp to render the flash-lamp conducting, means for thereupon producing a very brilliant exposure flash of light in the flash-lamp for a very brief period of time to illuminate the object to be photographed, a light-permeable envelope in which the flash-lamp is contained to protect the photographer from the high voltage to which the flash-lamp is subjected by the high-voltage impulse but without preventing the light of the flash from penetrating the envelope to the object, and a reflector for reflecting the light of the exposure flash.

6. Apparatus for use in flash-photography, having, in combination, a normally non-conducting gaseous-discharge helically coiled flash lamp, means for impressing a transient high-voltage impulse upon the flash-lamp to render the flash-lamp conducting, means for thereupon producing a very brilliant exposure flash of light in the flash-lamp for a very brief period of time to illuminate the object to be photographed, and a light-permeable envelope in which the flash-lamp is contained to protect the photographer from the high voltage to which the flash-lamp is subjected by the high-voltage impulse but without preventing the light of the flash from penetrating the envelope to the object.

7. Apparatus for use in flash-photography having, in combination, a normally non-conducting gaseous-discharge flash-lamp having an anode and a cathode, an insulating base provided with plug-in terminals respectively connected to the anode and the cathode, means for connecting the terminals to a source of energy, means for impressing a transient high-voltage impulse upon the flash-lamp to render the flash-lamp conducting to enable energy from the source to pass between the cathode and the anode through the flash-lamp, whereupon a very brilliant exposure flash of light will be produced in the flash-lamp for a very brief period of time to illuminate the object to be photographed, and a light-permeable envelope mounted on the base and in which the flash-lamp is contained to protect the photographer from the high voltage to which the flash-lamp is subjected by the high-voltage impulse but without preventing the light of the flash from penetrating the envelope to the object.

8. Apparatus for use in flash-photography having, in combination, a normally non-conducting gaseous-discharge flash-lamp having a trigger electrode, means for impressing a transient high-voltage impulse upon the trigger electrode to ionize the gas in the flash-lamp, thereby to render the flash-lamp conducting, means for thereupon producing a very brilliant exposure flash of light in the flash-lamp for a very brief period of time to illuminate the object to be photographed, and a light-permeable envelope in which the flash-lamp and the trigger electrode are contained to protect the photographer from the high voltage to which the trigger electrode and the flash-lamp are subjected by the high-voltage impulse but without preventing the light of the flash from penetrating the envelope to the object.

9. Apparatus for use in flash-photography having, in combination, a normally non-conducting gaseous-discharge flash-lamp having an anode, a cathode and a trigger electrode, means for connecting the anode and the cathode to a condenser, means for impressing a transient high-voltage impulse upon the trigger electrode to ionize the gas in the flash-lamp, thereby to render the flash-lamp conducting to enable the condenser to discharge suddenly between the cathode and the anode through the flash-lamp, whereupon a very brilliant exposure flash of light will be produced in the flash-lamp for a very brief period of time to illuminate the object to be photographed, and a light-permeable envelope in which the flash-lamp and the trigger electrode are contained to protect the photographer from the high voltage to which the trigger electrode and the flash-lamp are subjected by the high-voltage impulse but without preventing the light of the flash from penetrating the envelope to the object.

10. Apparatus for use in flash-photography having, in combination, a normally non-conducting gaseous-discharge flash-lamp having an anode, a cathode, and a trigger electrode, an insulating base provided with two plug-in terminals respectively connected to the anode and the cathode and a third plug-in terminal connected to the trigger electrode, means for connecting the said two terminals to a condenser, means for impressing a transient high-voltage impulse upon the third plug-in terminal to cause the trigger electrode to ionize the gas in the flash-lamp, thereby to render the flash-lamp conducting to enable the condenser to discharge suddenly between the cathode and the anode through the flash-lamp, whereupon a very brilliant exposure flash of light will be produced in the flash-lamp for a very brief period of time to illuminate the object to be photographed, and a light-permeable envelope mounted on the base and in which the flash-lamp and the trigger electrode are contained to protect the photographer from the high voltage to which the trigger electrode and the flash-lamp are subjected by the high-voltage impulse but without preventing the light of the flash from penetrating the envelope to the object.

11. Apparatus for use in flash-photography having, in combination, a normally non-conducting gaseous-discharge helically coiled flash-lamp having a trigger electrode, an insulating base provided with two plug-in terminals respectively connected to the anode and the cathode and a third plug-in terminal connected to the trigger electrode, one end of the trigger electrode being mounted over a coil of the helically coiled flash-lamp to help support the flash-lamp on the base, means for impressing a transient high-voltage impulse upon the trigger electrode to ionize the gas in the flash-lamp, thereby to render the flash-lamp conducting, means for thereupon producing a very brilliant exposure flash of light in the flash-lamp for a very brief period of time to illuminate the object to be photographed, and a light-permeable envelope in which the flash-lamp and the trigger electrode are contained to protect the photographer from the high voltage to which the trigger electrode and the flash-lamp are subjected by the high-voltage impulse but without preventing the light of the flash from penetrating the envelope to the object.

12. Apparatus for use in flash-photography having, in combination, a normally non-conducting gaseous-discharge helically coiled flash-lamp, means for impressing a transient high-voltage impulse upon the flash-lamp to render the flash-lamp conducting, means for thereupon producing a very brilliant exposure flash of light in the flash-lamp for a very brief period of time to illuminate the object to be photographed, and a light-permeable envelope in which the flash-lamp is contained to protect the photographer from the high voltage to which the flas-lamp is subjected by the high-voltage impulse but without preventing the light of the flash from penetrating the envelope to the object, the envelope having an axis substantially parallel to the axis of the helix of the flash-lamp.

13. Apparatus for use in flash-photography having, in combination, a normally non-conducting gaseous-discharge helically coiled flash-lamp, means for impressing a transient high-voltage impulse upon the flash-lamp to render the flash-lamp conducting, means for thereupon producing a very brilliant exposure flash of light in the flash-lamp for a very brief period of time to illuminate the object to be photographed, a light-permeable envelope in which the flash-lamp is contained to protect the photographer from the high voltage to which the flash-lamp is subjected by the high-voltage impulse but without preventing the light of the flash from penetrating the envelope to the object, and a reflector having an axis substantially parallel to the axis of the helix of the flash-lamp.

14. Apparatus for use in flash-photography having, in combination, a normally non-conducting gaseous-discharge flash-lamp, means for impressing a transient high-voltage impulse upon the flash-lamp to render the flash-lamp conducting, means for thereupon producing a flash of light in the flash-lamp to illuminate the object to be photographed, and a light-permeable envelope in which the flash-lamp is contained to protect the photographer from the high voltage to which the flash-lamp is subjected by the high-voltage impulse but without preventing the light of the flash from penetrating the envelope to the object.

KENNETH J. GERMESHAUSEN.